US009039210B2

(12) United States Patent
Longerich et al.

(10) Patent No.: US 9,039,210 B2
(45) Date of Patent: May 26, 2015

(54) VARIABLE LENGTH LIGHT SHIELD FOR AN ELECTRO-OPTICAL SENSOR WITHIN A NOSE CONE

(71) Applicant: Raytheon Company, Waltham, MA (US)

(72) Inventors: Gregory E. Longerich, Waltham, MA (US); William Owens, Waltham, MA (US); Richard J. Wright, Waltham, MA (US); David C. Robillard, Waltham, MA (US); Emerald J. Adair, Waltham, MA (US); Perry H. Frahm, Waltham, MA (US)

(73) Assignee: Raytheon Company, Waltham, MA (US)

( * ) Notice: Subject to any disclaimer, the term of this patent is extended or adjusted under 35 U.S.C. 154(b) by 170 days.

(21) Appl. No.: 13/734,588

(22) Filed: Jan. 4, 2013

(65) Prior Publication Data

US 2014/0192414 A1    Jul. 10, 2014

(51) Int. Cl.
    *G03B 11/00*     (2006.01)
    *F41G 7/22*      (2006.01)
    *G01S 3/781*     (2006.01)
    *G02B 5/00*      (2006.01)
    *G03B 11/04*     (2006.01)
    *G02B 27/00*     (2006.01)

(52) U.S. Cl.
    CPC .......... *F41G 7/2253* (2013.01); *F41G 7/2293* (2013.01); *G01S 3/781* (2013.01); *G02B 5/003* (2013.01); *G03B 11/04* (2013.01); *G02B 27/0018* (2013.01)

(58) Field of Classification Search
    USPC ......... 359/601, 604, 612; 244/171.7; 348/357
    See application file for complete search history.

(56) References Cited

U.S. PATENT DOCUMENTS

| 4,441,794 | A | 4/1984 | Field |
| 5,633,763 | A | 5/1997 | Suzuki et al. |
| 6,462,889 | B1 | 10/2002 | Jackson |
| 7,093,944 | B2 * | 8/2006 | Tanaka ........................ 359/611 |
| 7,557,995 | B1 * | 7/2009 | Lloyd .......................... 359/642 |
| 8,056,858 | B2 * | 11/2011 | Koehler et al. ............... 244/121 |
| 2003/0107668 | A1 * | 6/2003 | Yamamoto .................... 348/357 |
| 2004/0201896 | A1 * | 10/2004 | Lundgren et al. ............. 359/612 |
| 2010/0310242 | A1 | 12/2010 | Zubalsky et al. |
| 2012/0085895 | A1 | 4/2012 | Martin et al. |
| 2012/0267482 | A1 * | 10/2012 | Baudasse et al. .......... 244/171.7 |

OTHER PUBLICATIONS

PCT Application PCT/US2013/068309; filed Nov. 4, 2013; Raytheon Company; International Search Report mailed Jan. 31, 2014.

* cited by examiner

*Primary Examiner* — Suchin Parihar
*Assistant Examiner* — William R Alexander

(57) ABSTRACT

A variable length light shield is disclosed for an electro-optical sensor within a nose cone. The light shield includes a base, a telescopic shade supported by the base, and a ring rotatably supported about the base. The light shield also includes a guide tube disposed proximate the ring with an end extending away from the ring about a side of the telescopic shade. The light shield further includes an extension spring supported by the guide tube with an end coupled to the telescopic shade. Additionally, the light shield includes a cable extending through the guide tube and the extension spring, with one end of the cable coupled to the ring and another end of the cable coupled to the telescopic shade. The extension spring is configured to exert a force on the telescopic shade to extend the telescopic shade. Rotation of the ring causes retraction of the telescopic shade.

20 Claims, 5 Drawing Sheets

VARIABLE LENGTH LIGHT SHIELD FOR AN ELECTRO-OPTICAL SENSOR WITHIN A NOSE CONE

BACKGROUND

Sunshades are commonly used with electro-optical sensors of missiles or other vehicles, such as warheads, to mask out potentially damaging light on the focal plane array while imaging near the field of view of the sun. Bright objects, such as the earth, can also "blind" the sensors when in the field of view. Current sunshades typically have fixed lengths. Thus, to avoid blinding the sensors, the sensors may be powered down when the sun or other bright object is near the field of regard. On the other hand, the lack of protection may simply be accepted with the hope that no harm will result, such as permanent damage to high sensitivity imaging sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
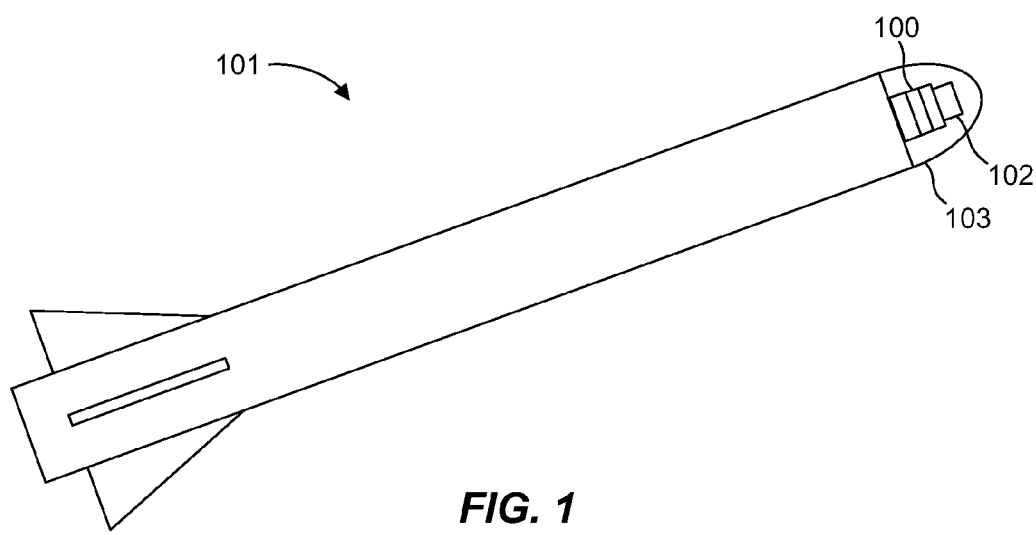
FIG. 1 is an example illustration of a vehicle, such as a missile, incorporating a variable length light shield for an electro-optical sensor within a nose cone of the vehicle, in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although fixed length sunshades with a relatively large length to diameter ratio can be effective for masking bright objects, such sunshades cannot be easily packaged within the payload volume under a nose cone without making payload compromises. Because such payload compromises in many instances can be unacceptable, space restrictions can preclude a sun shade long enough to be fully effective. In addition, fixed length sunshades can compromise information input with a permanently narrow field of view shield. A narrow field of view shield can limit the useful information to the sensors when the sun or a bright object is not within the field of view. Thus, an improved sunshade can prove beneficial for missile or other vehicle applications.

Accordingly, a variable length light shield is disclosed for an electro-optical sensor within a nose cone that is extendable to narrow the field of view when the sun is close to the field of regard. In one aspect, the variable length light shield is retractable for maximum field of view when platform environments and operating modes permit and necessitate a wider field of view.

The variable length light shield includes a base, a telescopic shade having a first portion supported by the base and a second portion movable relative to the first portion, and a ring rotatably supported about the base. The variable length light shield can also include a guide tube having a first end disposed proximate the ring and a second end extending away from the ring about a side of the telescopic shade. The variable length light shield can further include an extension spring having a first end supported by the guide tube and a second end supported by the second portion of the telescopic shade. Additionally, the variable length light shield can include a cable extending through the guide tube and the extension spring. The cable can have a first end coupled to the ring and a second end coupled to the second portion of the telescopic shade. The extension spring can be configured to exert a force on the second portion to extend the second portion away from the first portion. Rotation of the ring can cause movement of the second portion relative to the first portion.

A vehicle is also disclosed. The vehicle can comprise a nose cone, an electro-optical sensor within the nose cone, and a variable length light shield for the electro-optical sensor. The variable length light shield can comprise a base supported about the electro-optical sensor, a telescopic shade for the electro-optical sensor having a first portion supported by the base and a second portion movable relative to the first portion, and a ring rotatably supported about the base. The variable length light shield can also comprise a guide tube having a first end disposed proximate the ring and a second end extending away from the ring about a side of the telescopic shade. The variable length light shield can further comprise an extension spring having a first end supported by the guide tube and a second end supported by the second portion of the telescopic shade. In addition, the variable length light shield can comprise a cable extending through the guide tube and the extension spring. The cable can have a first end coupled to the ring and a second end coupled to the second portion of the telescopic shade. The extension spring can be configured to exert a force on the second portion to extend the second portion away from the first portion. Rotation of the ring can cause movement of the second portion relative to the first portion.

One embodiment of a variable length light shield 100 is illustrated in FIG. 1. As illustrated, the light shield 100 is part of a vehicle 101, such as a missile, warhead, or other similar vehicle that includes an electro-optical sensor 102 within a nose cone 103. The variable length light shield 100 can be extended after the vehicle 101 launch and nose cone ejection, if applicable. The light shield 100 can be configured to provide optimum masking of bright objects when extended and, when compressed or retracted, can be easily packaged in a restrictive or minimal packaging volume in the event dictated by various payload and nose cone profiles. Although a missile or kill vehicle is shown, the variable length light shield 100 can be utilized on any vehicle employing an electro-optical sensor for other applications, such as rocket-borne astronomy, mapping, etc.

Figure 2:
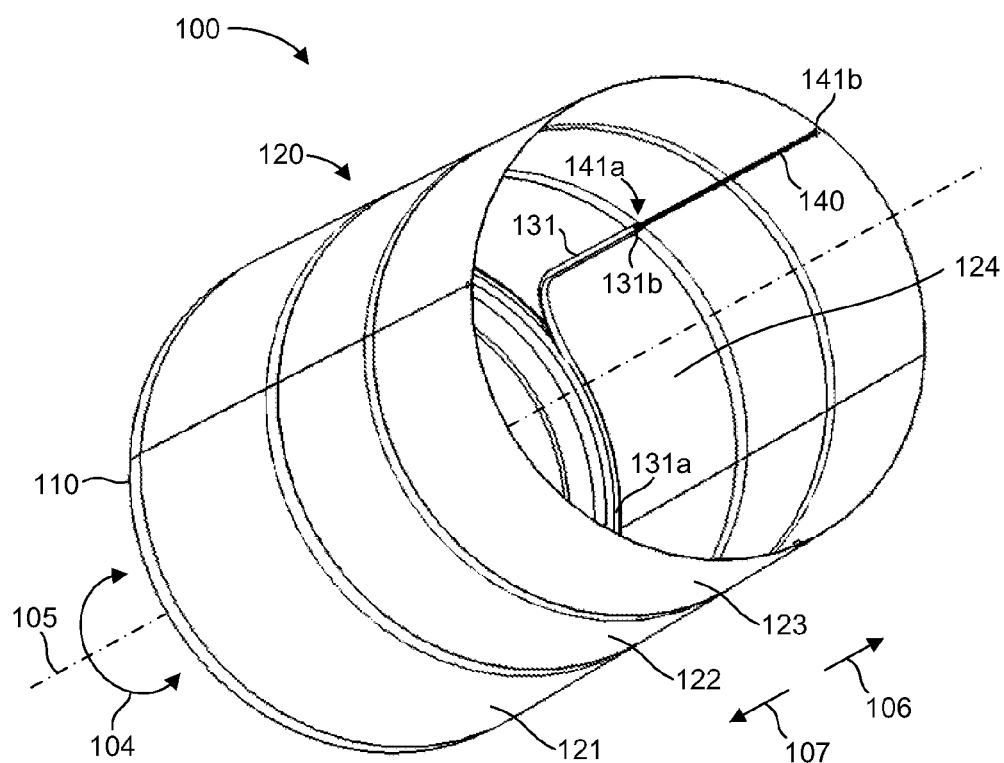
FIG. 2 is an example illustration of the variable length light shield of FIG. 1.

With further reference to FIG. 1, certain aspects of the variable length light shield 100 are shown in more detail in FIG. 2. For example, the light shield 100 can include a base 110, which can be configured to be supported about the electro-optical sensor 102. The light shield 100 can also include a telescopic shade 120 for the electro-optical sensor 102 having a portion 121 supported by the base 110 and a portion, such as portions 122, 123, movable relative to the portion 121. The telescopic shade 120 can protect the sensor 102 by limiting the field of view only when needed and can also be used to block irrelevant objects from the field of view. It should be recognized that the variable length light shield 100 can also be used or configured as an extendable shock-wave deflector.

Telescopic shade portion 122 can be disposed between the portion 121 and the portion 123 and the portions 122, 123 can be slideable within the portion 121 of the telescopic shade 120. A ring (hidden from view in FIG. 2, but shown in FIGS. 3-5) can be rotatably supported about the base 110 and can rotate in direction 104 about axis 105. The light shield 100 can also include a guide tube 131 having an end 131*a* disposed proximate the ring and an end 131*b* oriented to extend away from the ring about a side 124 of the telescopic shade 120. Furthermore, the light shield 100 can include an extension spring 140 having an end 141*a* supported by the guide tube 131 and an end 141*b* supported by the portion 123 of the telescopic shade 120. In one aspect, the extension spring 140 can be configured to extend from the end 131*b* of the guide tube 131. A cable (hidden from view in FIG. 2, but shown in FIGS. 5 and 6) can be guided between the ring and the portion 123 of the telescopic shade 120 by extending through the guide tube 131 and the extension spring 140. The cable can have an end coupled to the ring and an end coupled to the portion 123 of the telescopic shade 120. The extension spring 140 can be configured to exert a force on the portion 123 to extend the portion 123 away from the portion 121 in direction 106. In other words, the extension spring 140 can bias the portion 123 away from the portion 121. Rotation of the ring can cause movement of the portion 123 relative to the portion 121, such as to retract portion 122 and/or portion 123 in direction 107, which is opposite direction 106.

In one aspect, the telescopic shade 120 can be configured to extend from a retracted minimal length state to a fully deployed length suitable to shield light for a given application. Each portion 121, 122, 123 of the telescopic shade 120 can interlock with an adjacent portion when fully extended, providing a relatively rigid conical tube that can minimize deflection when lateral forces are applied, such as during flight maneuvers. Each element of the telescopic shade 120 can provide a "light tight" joint preventing stray light from outside the field of view from entering the electro-optical sensor 102. In one aspect, one or more of the portions 121, 122, 123 can be made from material only a few thousandths of an inch thick (i.e., 0.002"-0.010") while providing for interlocking of the portions and rigidity when fully extended, thus enabling production of an extremely lightweight light shade. In another aspect, manufacturing of the interlocking shade portions 121, 122, 123 can easily, and with low cost, be maintained within tight tolerances to produce a light tight tapered fit of the telescopic shade 120. The lightweight and compact design can facilitate packaging of the variable length light shield 100 within the nose cone 103 or an optics cavity of a telescope.

Figure 3:
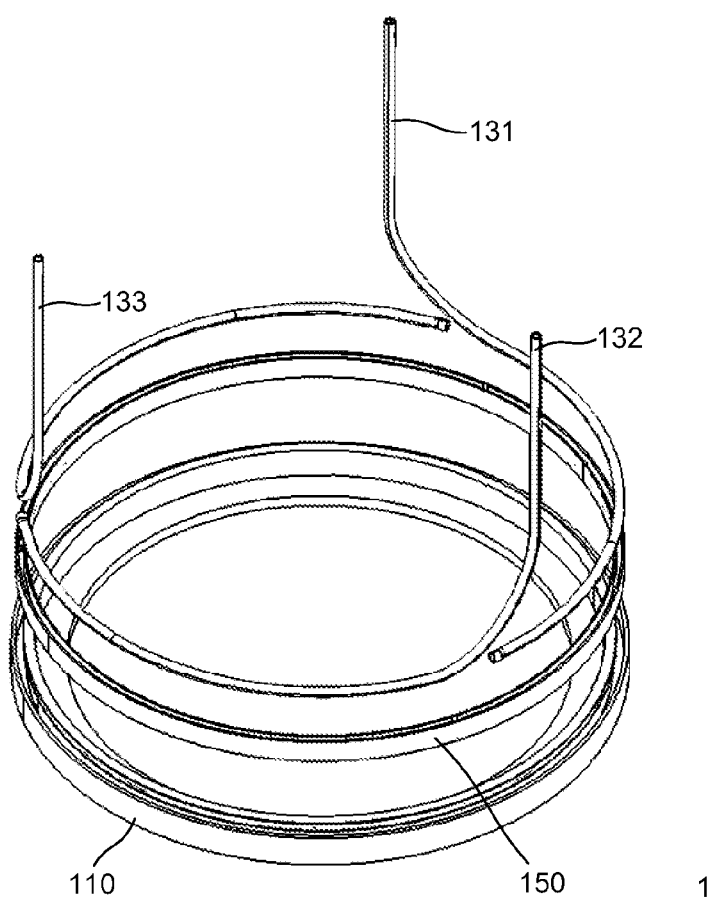
FIG. 3 is an exploded view of a base, a ring 150, and guide tubes of the variable length light shield of FIG. 1.

With continued reference to FIGS. 1 and 2, attention will now be given to FIGS. 3-6. FIG. 3 illustrates an exploded view of the base 110, a ring 150, and guide tubes 131, 132, 133. In one aspect, one or more of the guide tubes 131, 132, 133 can be rigid so as to be self-supporting. In another aspect, one or more guide tubes can be flexible, or non-rigid, such that the guide tubes can be bent or manipulated into a desired shape or configuration and supported by an external support, such as a boss or bracket supported by the base 110 and/or the telescopic shade 120, such as portion 121. It should also be recognized that a guide tube can include both a rigid portion and a flexible portion, such that advantages of each can be realized. Multiple guide tubes and associated extension springs can be utilized to cause extension of the telescopic shade 120. For example, as illustrated, three guide tubes 131, 132, 133 can be used to distribute extension force evenly around the telescopic shade 120 to minimize or prevent binding of the shade portions 121, 122, 123.

Figure 4:
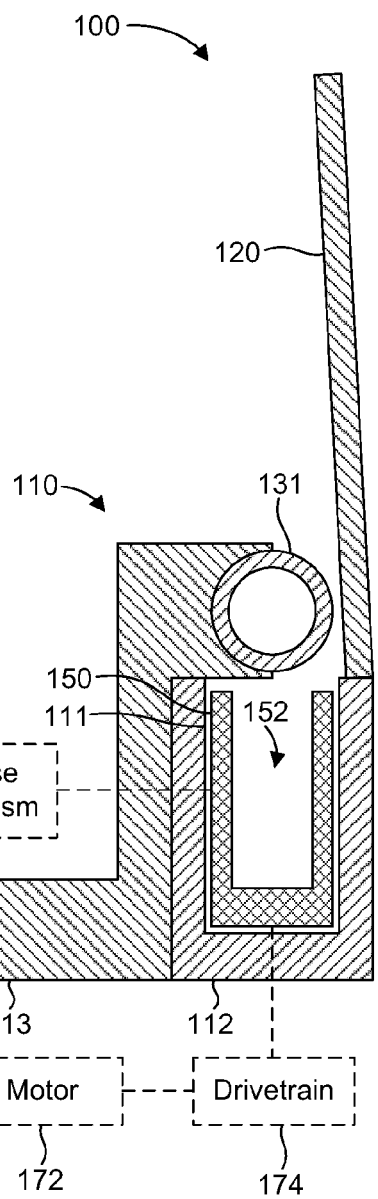
FIG. 4 is a schematic cross-sectional view of portions of a base, a telescopic shade, a ring, and a guide tube a of the variable length light shield of FIG. 1.

FIG. 4 illustrates a schematic cross-sectional view of portions of the base 110, the telescopic shade 120, the ring 150, and the guide tube 131 of the variable length light shield 100. The base 110 can be configured to rotatably support the ring 150. As shown, the base 110 can include a recess 111 or a channel in which the ring 150 can reside. Although not shown, bearings, lubricant, or other features can be included to facilitate rotation of the ring 150 relative to the base 110. The base 110 can also be configured to support the guide tube 131 such that the ring 150 can rotate relative to the guide tube 131 as well as the base 110. Any suitable coupling configuration can be used to couple or mount the guide tube 131 to the base 110. Additionally, the base 110 is illustrated supporting the telescopic shade 120. As with the guide tube 131, any suitable coupling configuration can be used to couple or mount the telescopic shade 120 to the base 110. To facilitate assembly of the ring 150 and the base 110, the base 110 can comprise multiple structures 112, 113. This can allow the ring 150 to be disposed in the recess 111 of structure 112, followed by coupling structure 113 to structure 112, which can effectively capture the ring 150 in the recess 111. It should be recognized that the base 110 can, in some embodiments, be configured as a single unitary structure.

Figure 5:
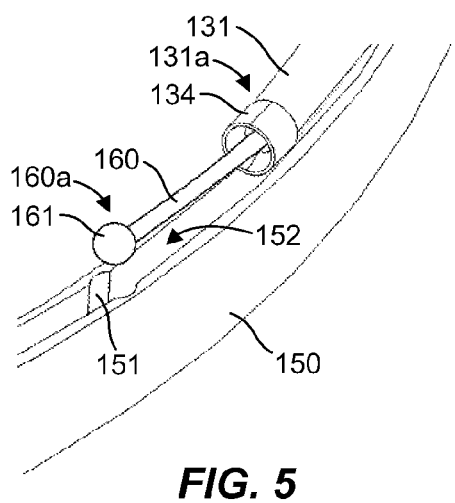
FIG. 5 is a close-up isolation view of a ring 150 and a guide tube of the variable length light shield of FIG. 1.

FIG. 5 illustrates a close-up isolation view of the ring 150 and the guide tube 131. In particular, the end 131*a* of the guide tube 131 that is disposed proximate the ring 150 is shown. A cable 160 can extend through the guide tube 131 and can have an end 160a coupled to the ring 150. The guide tube 131 can also comprise a ferrule 134 disposed at the end 131a of the guide tube 131. The ferrule 134 can be configured to facilitate movement of the cable 160 therethrough. The cable 160 is shown separated from the ring 150 to better illustrate aspects of the cable 160 and the ring 150. For example, the cable 160 can include a nipple 161 disposed at the end 160a of the cable 160 and the ring 150 can have a receptacle 151 to receive the nipple 161. The nipple 161 and the receptacle 151 can therefore facilitate coupling of the cable 160 and the ring 150. Additionally, as also shown in FIG. 4, the ring 150 can include a channel 152 or trough to receive the cable 160 as the cable 160 is drawn from the guide tube 131 upon rotation of the ring 150. Thus, the cable 160 can wind around or unwind from the ring 150 in the channel 152 as the ring 150 is rotated to cause retraction or extension of the telescopic shade 120.

Figure 6:
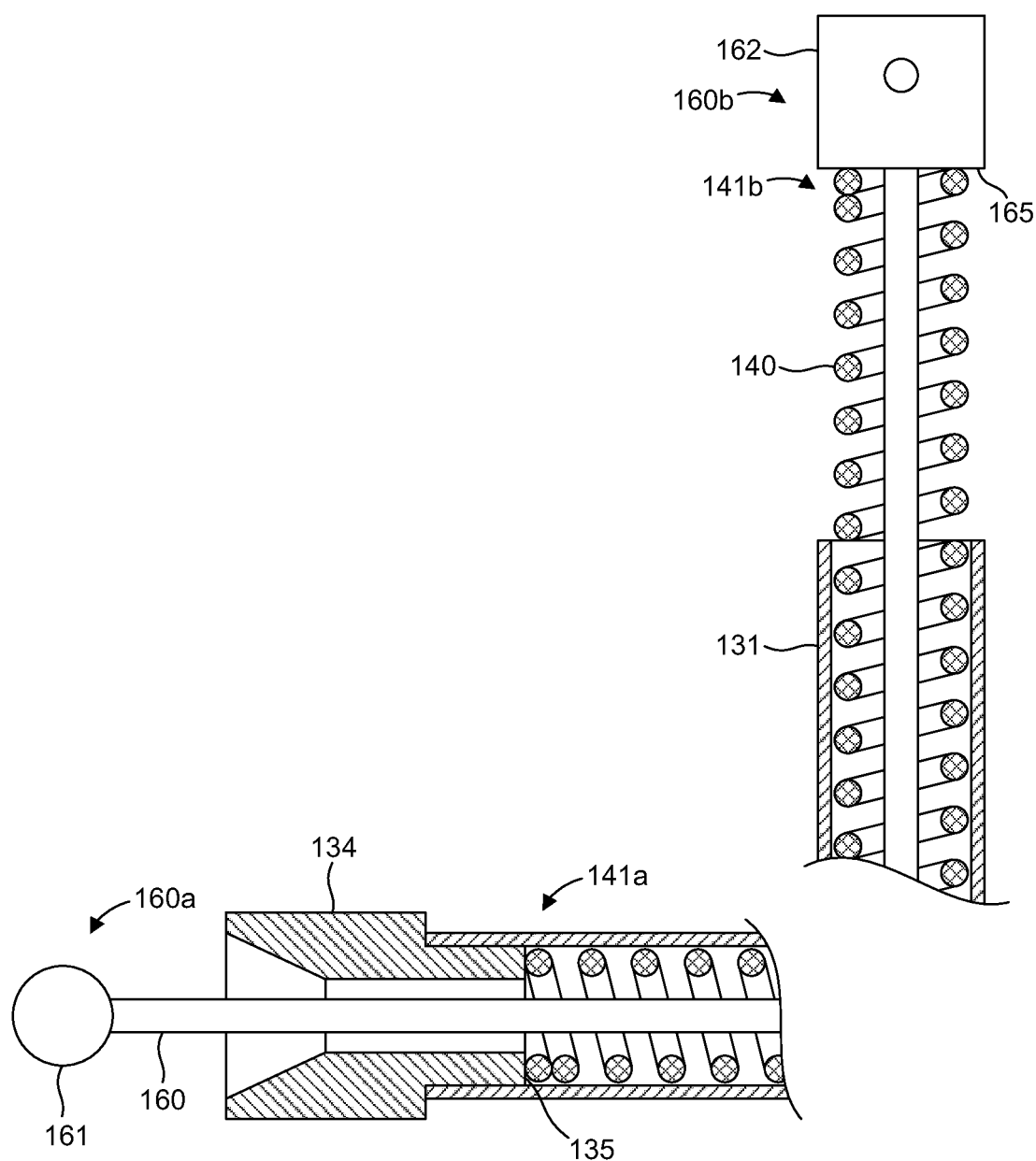
FIG. 6 is a schematic cross-sectional view of a guide tube, an extension spring, and a cable of the variable length light shield of FIG. 1.

FIG. 6 illustrates a schematic cross-sectional view of the guide tube 131, the extension spring 140, and the cable 160. The end 141a of the extension spring 140 is shown supported by the guide tube 131 by being disposed in the guide tube 131. The ferrule 134 can be configured to provide a mechanical stop for the extension spring 140, such as by providing a shoulder 135 or base for the end 141a of the extension spring 140 to contact or seat against. In one aspect, the extension spring 140 can comprise a coil spring, as illustrated, and the cable 160 can extend through the coil spring. The nipple 161 at end 160a of the cable 160 can couple with the ring 150, as discussed above. An anchor 162 can be disposed at an end 160b, opposite end 160a, and can be configured to couple with the telescopic shade 120, such as a top edge of telescopic shade portion 123, and provide a shoulder 165 for end 141b of the extension spring 140 to contact or seat against. This configuration can facilitate compression of the extension spring 140 within at least a portion of the guide tube 131. The cable 160, as coupled to the ring 150, can maintain the extension spring 140 in compression in order to hold the telescopic shade 120 in a retracted condition. Rotation of the ring 150 can lessen the tension on the cable 160, which can permit the extension spring 140 to extend, thus extending the telescopic shade 120 with force provided by the extension spring 140.

Referring again primarily to FIG. 4, in one aspect the variable length light shield 100 can include a release mechanism 170 operable to maintain the ring 150 in a fixed position and to selectively release the ring 150 for rotational movement to facilitate extension of the telescopic shade 120 by the extension spring 140. The release mechanism 170 can include a catch, a pawl, a ratchet or any other feature or device operable with the ring 150 to maintain the ring 150 in a fixed position and to selectively release the ring 150 for rotational movement. The release mechanism 170 can be used, for example, to facilitate a "one time" deployment of the telescopic shade 120 by releasing the ring 150 and allowing full extension of the telescopic shade 120, as dictated by the telescopic shade configuration or the length of the cable 160. In a particular aspect, the release mechanism can be configured to "catch" the ring 150 following release, in order to stop the telescopic shade 120 at a desired extension length that is less than a fully deployed extension length. The release mechanism can also be configured to "re-release" the ring 150 to allow additional extension of the telescopic shade 120. In this way, the release mechanism 170 can facilitate one or more extension lengths between the fully retracted configuration and the fully extended configuration.

In another aspect, the variable length light shield 100 can include a motor 172, such as a servo motor, operatively coupled to the ring 150, such as by a drivetrain 174. The drivetrain 174 can comprise gears and/or a belt to selectively control rotation of the ring 150 to facilitate extension of the telescopic shade 120 by the extension spring 140 and retraction of the telescopic shade 120 by the cable 160. In other words, the motor 172 can apply a force to the ring 150 that can act against the extension spring 140 to retract the telescopic shade 120. Thus, the extension spring 140 can serve to extend the telescopic shade 120 and the motor 172 can serve to retract the telescopic shade 120. This can facilitate controlled movement of the ring 150 for adjustment of the telescopic shade 120 to any desired extended length at a selectively variable speed between the fully retracted and fully extended positions.

As shown in FIG. 3, multiple guide tubes 131, 132, 133 can be used to facilitate use of multiple springs, as well as multiple cables coupled to a single common ring 150. This configuration can help maintain the telescopic shade 120 in proper alignment to prevent binding as the telescopic shade 120 is deployed and retracted.

Figure 7A:
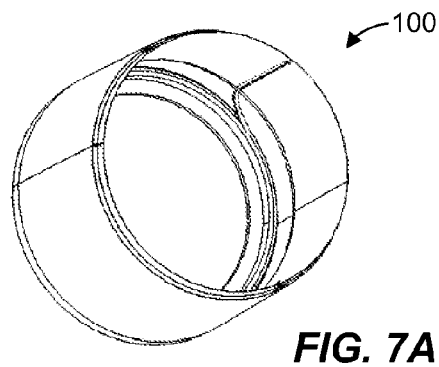
FIGS. 7A-7D are example illustrations of the variable length light shield of FIG. 1 in operation, in accordance with an embodiment of the present invention.
Figure 7B:
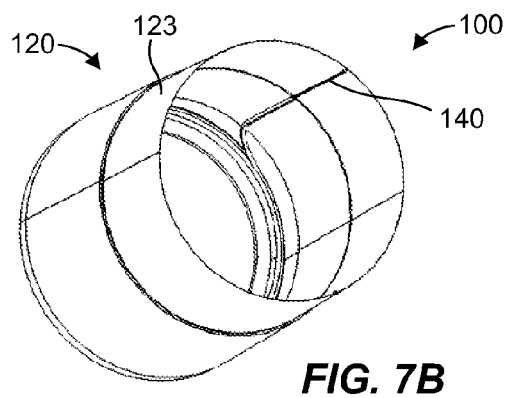
Figure 7C:
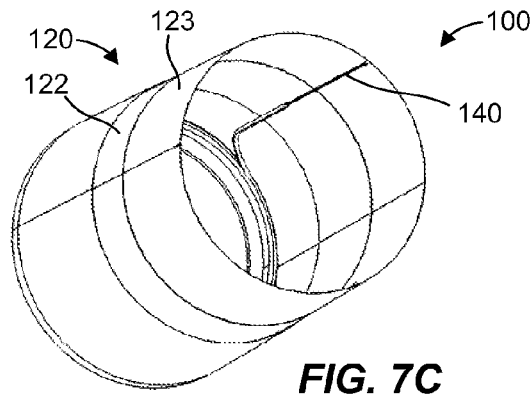
Figure 7D:
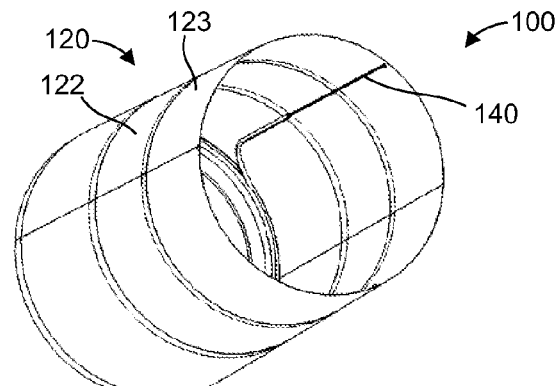

With continued reference to FIGS. 1-6, FIGS. 7A-7D illustrate the variable length light shield 100 in operation. FIG. 7A shows the variable length light shield 100 in a fully retracted configuration. Upon rotation of the ring, the variable length light shield 100 can begin to deploy, as shown in FIG. 7B. Deployment, or extension of the variable length light shield 100, can be initiated by a release mechanism to release the ring, or a motor that can control the rotational position of the ring. As the ring rotates and the cable attached to the ring unwinds, the extension spring 140 can push on the telescopic shade portion 123 to extend the light shade 120. For example, as shown in FIG. 7C, the telescopic shade portion 123 can extend sufficient to cause telescopic shade portion 122 to begin to extend. Extension of the telescopic shade portions 122, 123 can continue until the light shade 120 is fully deployed or extended, as shown in FIG. 7D. It should be recognized that the variable length light shield 100 can be configured to deploy or extend to an extension length that is less than full extension, such as shown in FIG. 7B or 7C, and to maintain the extension length. This can be accomplished by controlling movement or the rotational position of the ring, such as with a motor coupled to the ring via a drivetrain. To retract the light shade 120, the motor can cause rotation of the ring, causing the cable to act against the extension spring 140.

Figure 8A:
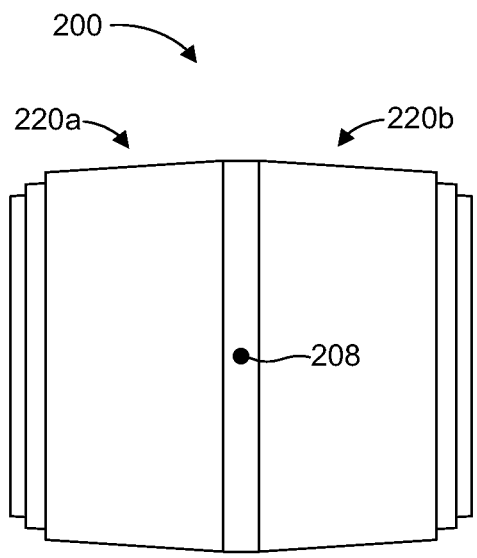
FIGS. 8A and 8B are example illustrations of a variable length light shield for an electro-optical sensor within a nose cone, in accordance with another embodiment of the present invention.
Figure 8B:
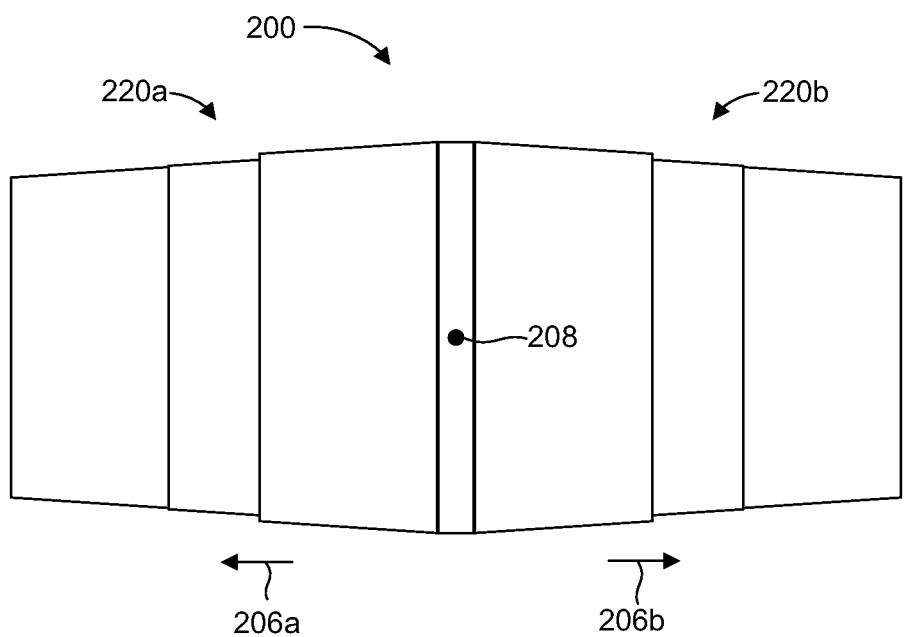

FIGS. 8A and 8B illustrate another embodiment of a variable length light shield 200. The variable length light shield 200 can include any element or aspect of the variable length light shield 100 discussed herein with reference to FIGS. 1-7D. As shown, the variable length light shield 200 can include two telescopic shades 220a, 220b for dual direction extension and/or retraction. In one aspect, extension of the telescopic shades 220a, 220b can be configured to be in opposite directions 206a, 206b. Extension and/or retraction of the telescopic shades 220a, 220b can therefore be coordinated to maintain a relative location of a center of mass 208 within the variable length light shield 200. This can be beneficial for an application, such as a missile or kill vehicle, where shifting mass can negatively impact stability of the vehicle. Maintaining the relative location of the center of mass within the variable length light shield 200 can minimize the negative mass-shifting effects of operating the variable length light shield 200 while the vehicle is in flight.

In accordance with one embodiment of the present invention, a method for facilitating the shielding of light otherwise incident on an electro-optical sensor within a nose cone is disclosed. The method can comprise obtaining a base. The method can also comprise disposing a ring about the base, the ring being rotatably supported about the base. The method can further comprise disposing a telescopic shade about the base, the telescopic shade having a first portion supported by the base and a second portion movable relative to the first portion. The method can still further comprise biasing the second portion to extend the second portion away from the first portion. Additionally, the method can comprise guiding a cable between the ring and the second portion of the telescopic shade, wherein rotation of the ring causes movement of the second portion relative to the first portion. It is noted that no specific order is required in this method, though generally in one embodiment, these method steps can be carried out sequentially.

In one aspect, the method can further comprise causing the ring to rotate. In another aspect, guiding a cable can comprise disposing a first end of a guide tube proximate the ring and orienting a second end of the guide tube extending away from the ring about a side of the telescopic shade, and extending the cable through the guide tube and the extension spring, the cable having a first end coupled to the ring and a second end coupled to the second portion of the telescopic shade. In a specific aspect, biasing the second portion can comprise supporting a first end of an extension spring by the guide tube and supporting a second end of the extension spring by the second telescopic shade portion.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A variable length light shield for an electro-optical sensor within a nose cone, comprising:
    a base;
    a telescopic shade having a first portion supported by the base and a second portion slideable relative to the first portion;
    a ring rotatably supported about the base;
    a guide tube having a first end disposed proximate the ring and a second end extending away from the ring about a side of the telescopic shade;
    an extension spring having a first end supported by the guide tube and a second end supported by the second portion of the telescopic shade; and
    a cable extending through the guide tube and the extension spring, the cable having a first end coupled to the ring and a second end coupled to the second portion of the telescopic shade,
    wherein the extension spring is configured to exert a force on the second portion to extend the second portion away from the first portion, and
    wherein rotation of the ring causes movement of the second portion relative to the first portion.

2. The variable length light shade of claim 1, wherein the telescopic shade further comprises a third portion disposed between the first portion and the second portion.

3. The variable length light shade of claim 1, wherein the second portion of the telescopic shade is slideable within the first portion of the telescopic shade.

4. The variable length light shade of claim 1, wherein the first end of the extension spring is disposed in the guide tube.

5. The variable length light shade of claim 4, wherein the guide tube comprises a ferrule disposed at the first end configured to provide a mechanical stop for the extension spring and to facilitate movement of the cable therethrough.

6. The variable length light shade of claim 1, wherein the extension spring comprises a coil spring.

7. The variable length light shade of claim 1, wherein the guide tube is rigid so as to be self-supporting.

8. The variable length light shade of claim 1, wherein the cable comprises a nipple disposed at the first end of the cable and the ring comprises a receptacle to receive the nipple, the nipple and the receptacle facilitating coupling of the cable and the ring.

9. The variable length light shade of claim 1, wherein the ring comprises a channel to receive the cable as the cable is drawn from the guide tube.

10. The variable length light shade of claim 1, wherein the base is configured support the guide tube.

11. The variable length light shade of claim 1, further comprising a release mechanism operable to maintain the ring in a fixed position and to selectively release the ring for rotational movement to facilitate extension of the telescopic shade by the extension spring.

12. The variable length light shade of claim 1, further comprising a motor operatively coupled to the ring by a drivetrain to selectively control rotation of the ring to facilitate extension of the telescopic shade by the extension spring and retraction of the telescopic shade by the cable.

13. A vehicle, comprising:
    a nose cone;

an electro-optical sensor within the nose cone; and
a variable length light shield for the electro-optical sensor, the light shield comprising:
  a base supported about the electro-optical sensor,
  a telescopic shade for the electro-optical sensor having a first portion supported by the base and a second portion slideable relative to the first portion,
  a ring rotatably supported about the base,
  a guide tube having a first end disposed proximate the ring and a second end extending away from the ring about a side of the telescopic shade,
  an extension spring having a first end supported by the guide tube and a second end supported by the second portion of the telescopic shade, and
  a cable extending through the guide tube and the extension spring, the cable having a first end coupled to the ring and a second end coupled to the second portion of the telescopic shade,
  wherein the extension spring is configured to exert a force on the second portion to extend the second portion away from the first portion, and
  wherein rotation of the ring causes movement of the second portion relative to the first portion.

14. The vehicle of claim 13, further comprising a motor operatively coupled to the ring by a drivetrain to selectively control rotation of the ring to facilitate extension of the telescopic shade by the extension spring and retraction of the telescopic shade by the cable.

15. The vehicle of claim 13, further comprising a second telescopic shade, wherein the first telescopic shade and the second telescopic shade extend in opposing directions.

16. The vehicle of claim 15, wherein extension of the first telescopic shade and extension of the second telescopic shade is coordinated to maintain a relative location of a center of mass within the variable length light shield.

17. A method for facilitating the shielding of light otherwise incident on an electro-optical sensor within a nose cone, the method comprising:
  obtaining a base;
  disposing a ring about the base, the ring being rotatably supported about the base;
  disposing a telescopic shade about the base, the telescopic shade having a first portion supported by the base and a second portion slideable relative to the first portion;
  biasing the second portion to extend the second portion away from the first portion; and
  guiding a cable between the ring and the second portion of the telescopic shade, wherein rotation of the ring causes movement of the second portion relative to the first portion.

18. The method of claim 17, further comprising causing the ring to rotate.

19. The method of claim 17, wherein guiding a cable comprises:
  disposing a first end of a guide tube proximate the ring and orienting a second end of the guide tube extending away from the ring about a side of the telescopic shade; and
  extending the cable through the guide tube and the extension spring, the cable having a first end coupled to the ring and a second end coupled to the second portion of the telescopic shade.

20. The method of claim 19, wherein biasing the second portion comprises supporting a first end of an extension spring by the guide tube and supporting a second end of the extension spring by the second telescopic shade portion.

* * * * *